United States Patent Office 3,350,495
Patented Oct. 31, 1967

3,350,495
HIGH TEMPERATURE VACUUM FURNACE
Alfred H. Barnes, deceased, late of New York, N.Y., by Martin C. Seham, executor, New York, N.Y., and Cecil G. Chadwick, Lewiston, N.Y., assignors to Union Carbide Corporation, a corporation of New York
Filed Dec. 2, 1966, Ser. No. 599,354
3 Claims. (Cl. 13—31)

ABSTRACT OF THE DISCLOSURE

Device suitable for the continuous furnacing of solid materials, for example, pellets of admixed high carbon ferrochrome and oxidant, utilizing electrical heating means and a rotatable shell in which solid material is heated.

---

Figure 1:
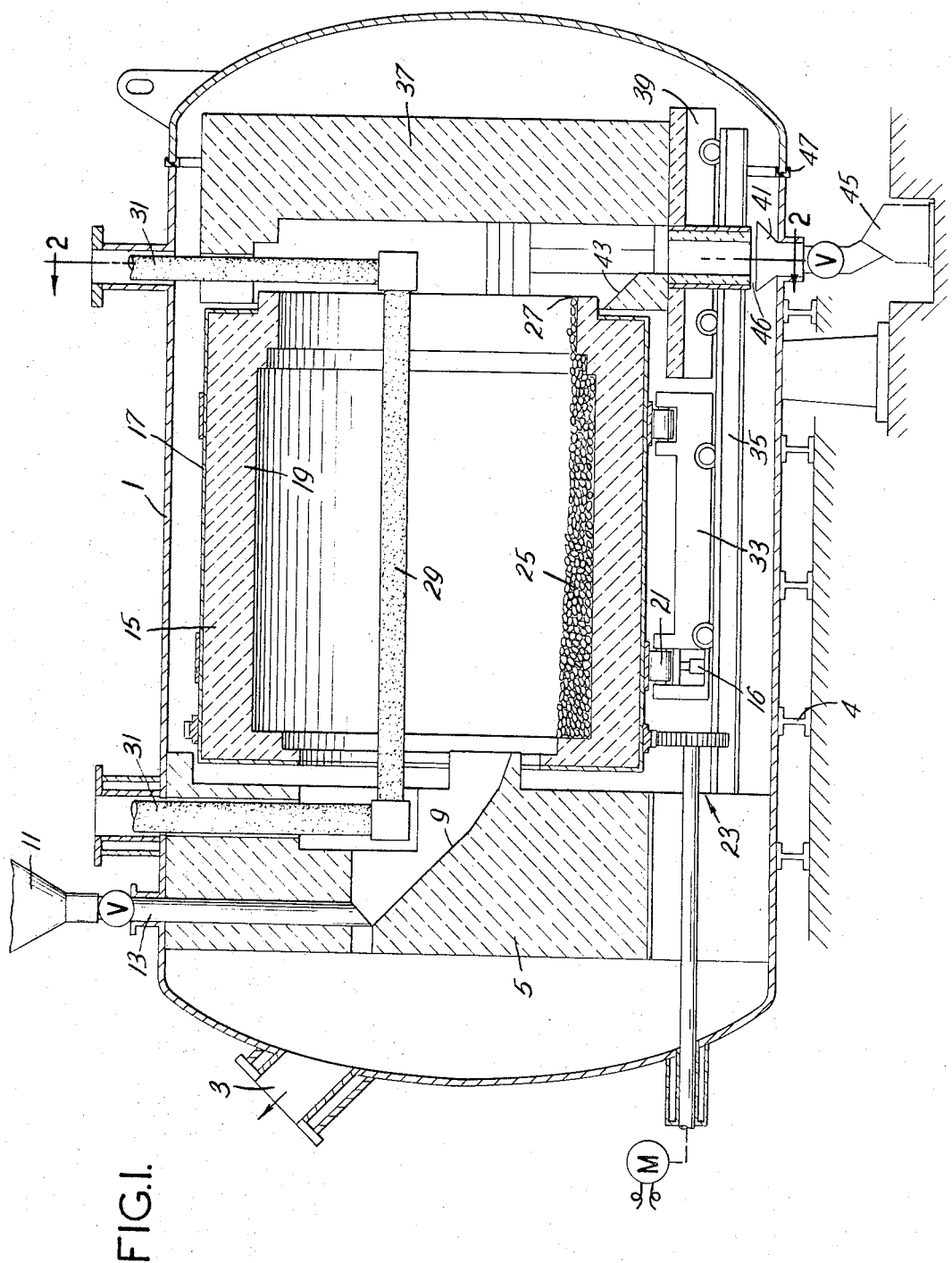

The present invention relates to high temperature vacuum furnaces. More particularly the present invention is directed to a high temperature vacuum furnace which can be used to provide continuous operation in the decarburization of high carbon ferrochrome and the production of low carbon ferrochrome briquets.

Low carbon ferrochromium, e.g., FeCr, containing a maximum of 0.025% carbon is a material of considerable industrial utility in steelmaking and can be considered rather unique in view of the exceptionally strong affinity of chromium for carbon, and this natural affinity compels the use of special processing procedures in the making of this alloy. For example, up to the present time, low carbon ferrochromium has been manufactured only on a batch basis whereby finely divided high carbon ferrochrome (5.5% C) and oxygen bearing materials, e.g., oxidized ferrochrome, are mixed, briquetted and then heated to elevated temperatures, for example on the order of 1300° C., in large vacuum chambers, at pressures of 3 mm. and less. In the course of heating, which ordinarily requires 20 to 30 hours or more for the quantities usually processed, a solid state reaction occurs between the high carbon ferrochrome and oxygen bearing material which results in the desired low carbon product. The aforedescribed product is highly satisfactory and the process is reasonably efficient. However, in view of the high temperatures employed and the necessary stopping and starting of the process for cooling, product removal and re-charging, considerable heat energy and production time is lost. Further, due to the required temperature cycling, the structural materials of the furnacing equipment are subjected to severe heat shock which necessitates regular reconstruction and repair. Also, since the material being processed is generally arranged in static layers, an excess of thermal energy is usually required as a precaution to avoid underheating.

It is therefore an object of the present invention to provide a furnace which is capable of essentially continuous production of low carbon ferrochrome.

It is another object of the present invention to provide apparatus for the continuous production of low carbon ferrochrome which results in improved thermal efficiency and increased rate of production.

Figure 2:
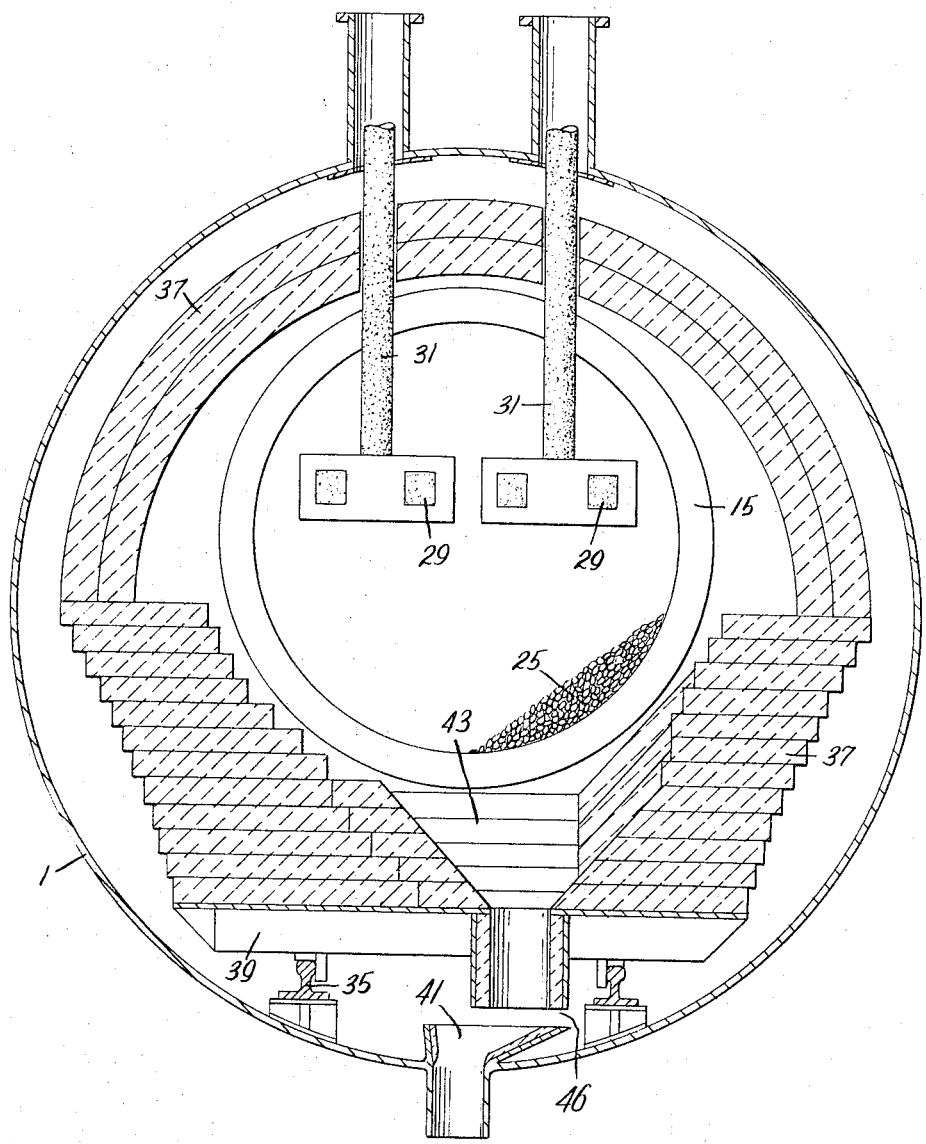

Other objects will be apparent from the following description and claims taken in conjunction with the drawing in which:

FIGURE 1 shows an elevation view, partly in section, of a furnace in accordance with the present invention and FIGURE 2 shows a sectional view of the furnace of FIGURE 1.

With reference to the drawing, which shows a particular embodiment of the present invention, the numeral 1 refers to a steel shell enclosure member which can be on the order of 12 feet in diameter and 16 feet long with a wall thickness of ⅜ inch. The shell 1 is provided with an exhaust outlet 3 which is connected to a suitable conventional pumping mechanism (not shown) whereby the pressure within the enclosure can be reduced to 3 mm. or less. As shown in the drawing, the steel shell 1 is supported in a horizontal position by suitable supports 4. Within the steel enclosing member 1 a stationary wall 5 is arranged which is formed of a suitable refractory which can be for example, commercially available insulating alumina. Within wall 5 a downwardly sloping passage 9 is provided which is adapted to receive solid charge material, e.g., high carbon FeCr+ oxidized ferrochrome briquets, from vacuum feed hopper 11 by way of charge inlet 13. The charge material which travels through passage 9 enters shell 15 as shown. Shell 15 is a rotatable member formed of a steel shell 17 which has an interior lining of refractory brick indicated at 19 which can be of commercially available high temperature alumina. The rotatable shell 15, which is mounted on rollers 21, is driven by a suitable drive mechanism shown at 23 and receives the charge material introduced at passage 9. The charge material 25 moves through shell 15 and is ultimately discharged at 27 due to the slight incline in this direction of the shell 15 which is adjustable by means of jack 16. In the course of its travel through shell 15 the charge material 25 is exposed to heat developed by heating elements 29 which can be in the form of carbon bars, detachably supported by supports 31, and energized by a suitable electrical source (not shown). As can be seen from the drawing, rotatable shell 15 is supported on wheeled platform 33 which in turn is arranged to roll on tracks 35 which are located in the bottom portion of enclosing shell 1. This arrangement permits convenient construction of stationary wall 5 inside enclosing shell 1 after which rotatable shell 15 can be easily rolled into position closely adjacent to the wall 5.

As can be further seen from the drawing, a wall 37, formed of refractory in a manner similar to wall 5, is mounted on a second wheeled platform 39, can can thus be rolled into position closely adjacent rotatable shell 15 and above the product outlet 41 in shell 1. Outlet 41 receives the furnaced product by way of the downwardly sloping passage 43 in wall 37 and the product passing through outlet 41 is collected in vacuum storage vessel 45 from which it can be removed through a conventional lock system without disturbing the low vacuum environment in enclosing shell 1.

Closing member 47, after rotatable shell 15 and movable wall 37 have been rolled into place, is affixed to shell 1 to provide a gas-tight seal therewith as indicated.

In the operation of the furnace of the present invention, a furnace charge is prepared by crushing and milling high carbon ferrochrome (about 5.5% C) to a finely divided state, e.g., about 300 mesh and then mixing the crushed ferrochrome with an oxidizer such as oxidized ferrochrome which also has been particulated to about 300 mesh.

A binder such as Mogul and water are added to the ferrochrome-oxidizer mixture which is then formed into briquets of a convenient size, e.g., 2" x 2" x 1¼". The briquets are then fed to storage feed vessel 11. The enclosure shell 1 is evacuated via exhaust outlet 3 to a pressure of about 3 mm. or less and heating elements 29 are energized to heat the interior of enclosing vessel 1 to a temperature of about 1300° C. That is, the portions of refractory walls 5 and 37 and lining 19 which are directly exposed to the thermal energy provided by heating elements 29 are heated to about 1300° C. and thus provide a uniformly heated reaction environment for the charge material which is continuously introduced from storage vessel 11, through passage 9 into rotatable shell 15. The material in shell 15 is continuously exposed to heat from the refractory lining 19 and heating elements 29 as it passes through shell 15 and under these conditions the charge constituents react, in the solid state, to produce a final product containing 0.025% carbon or less. The solid product is collected in vacuum collection vessel 45 after exiting rotatable shell 15 at 46 and passing through passage 43 in wall 37; the carbon monoxide which is formed during the reaction is continuously withdrawn at exhaust outlet 3.

A particular advantage of the present invention is that it can provide production of low carbon ferrochrome on a continuous basis and thus avoid the energy losses which were inherent in the previous batch processes which required cooling of the furnace in the course of product removal. Also, since the temperature of the refractories in the furnace of this invention remains substantially constant, refractory consumption is greatly minimized since cycling and thermal shock is avoided. Further, the rate of production is greatly increased as compared to batch type processes. In addition, by mounting rotatable shell 15 and wall 37 on wheeled platforms, the furnace structure can be readily and conveniently inspected and repaired. Also, the relative portions of the refractory walls and shell 15 can be adjusted to compensate for any slight erosion which may occur at the material inlets and outlets thus prolonging the effective operating life of the equipment. Moreover, the ability to adjustably move rotatable member 15 and wall 37 avoids the requirement of exceptionally close dimensional tolerances ordinarily required in rotating equipment.

The following example will further illustrate the present invention.

*Example I*

A furnace similar to that shown in the drawing was constructed using a steel enclosing shell 12 feet long x 9 feet in diameter. The steel shell was ⅜ inch thick. A rotatable shell member, mounted on a wheeled platform was arranged within the enclosing steel shell between a stationary refractory wall and a moveable refractory wall mounted on a second wheeled platform. The rotatable member was formed of a steel shell 7 feet in diameter and ⅜ inch thick. The shell had a lining of alumina refractory brick 9 inches thick. The refractory walls were approximately 6 feet wide x 7 feet high x 1½ to 2 feet thick.

A charge of admixed high carbon ferrochrome and oxidized ferrochrome in the form of pellets (2 inches x 2 inches x 1¼ inches) was prepared from a finely divided mixture (about 300 mesh) in which the ratio of high carbon ferrochrome to oxidized ferrochrome was about 2.5 to 1. The furnace, upon being evacuated to about 1 mm. of Hg and heated to approximately 1300° C. can process the charge of high carbon ferrochrome+oxidized ferrochrome pellets and produce low carbon ferrochromium (0.025% C) at a rate of 500 pounds per hour at 0.8 kw. per pound of electrical power input. When using the same charge materials and a furnace of about the same volume but employing static bed techniques, the rate of production was 100 pounds per hour and the electrical power consumption was 1.1 kwhr. per pound of product.

In addition to the production of low carbon ferrochromium, the apparatus of the present invention can be used in the furnacing of other solid materials which are amenable to vacuum furnacing in static beds.

The mesh sizes referred to herein are U.S. Screen Series.

What is claimed is:
1. An apparatus for the furnacing of solid material which comprises:
 (1) a horizontally disposed generally cylindrical steel enclosing member adapted to be sealed to the atmosphere and having
  (i) a gas exhaust outlet and
  (ii) a solid charge material inlet at the upper portion thereof;
 (2) gas-tight charge material feeding means communicating with said charge material inlet;
 (3) a stationary vertical wall of refractory brick arranged within the steel enclosing member and transverse to the longitudinal axis thereof, said stationary wall having a downwardly sloping passage therein communicating with the charge material inlet;
 (4) track means located in the steel enclosure in the bottom portion thereof running parallel to the longitudinal axis of the steel shell enclosure;
 (5) a first movable platform adapted to be transported on the track means;
 (6) a cylindrical shell, having an interior lining of refractory brick, rotatably mounted on said first movable platform being arranged with its longitudinal axis parallel to the longitudinal axis of said steel shell enclosure, said cylindrical shell being inclineable to provide a downward slope towards the open end of the enclosing steel shell and being adapted to be positioned closely adjacent said stationary wall by movement of said movable platform whereby charge material which is introduced through said charge inlet and passes through the passage in said wall enters said rotatable shell;
 (7) a second movable platform adapted to be transported on said track means;
 (8) a second vertical wall of refractory brick arranged transverse to the longitudinal axis of said enclosing steel shell, said second wall of refractory brick being mounted on said second movable platform and adapted to be positioned closely adjacent said rotatable shell by movement of said movable platform; said second vertical wall having a downwardly sloping passage therein arranged to receive solid material which passes through said rotatable shell;
 (9) a gas-tight collecting vessel communicating with said steel enclosing member at the bottom portion thereof being located to receive material passing through the sloping passage in said second vertical wall when said second vertical wall is located closely adjacent said rotatable shell;
 (10) electrical heating means arranged within said rotatable shell, said heating means being fixedly mounted with respect to said rotatable shell and spaced away from the inner walls thereof;
 (11) drive means for rotating said rotatable shell;
 (12) a closure member adapted to engage with said enclosing steel shell to provide a gas-tight seal therewith and
 (13) means adapted to be connected to the exhaust outlet of said enclosing steel shell to provide a low pressure environment therein.

2. An apparatus in accordance with claim 1 wherein the adjacent portions of the rotatable shell and second stationary wall are arranged in a substantially telescoping but non-contacting relation.

3. An apparatus in accordance with claim 1 wherein means are provided to permit variable adjustment of the slope of the cylindrical shell to thereby provide control of the rate of passage of solid material through the apparatus.

References Cited
UNITED STATES PATENTS

| | | | |
|---|---|---|---|
| 2,089,022 | 8/1937 | George et al. | 13—21 |
| 2,129,007 | 9/1938 | Kalling et al. | 13—21 |
| 2,143,197 | 1/1939 | Lang | 13—21 |
| 2,745,891 | 5/1956 | Darby et al. | 13—31 |
| 2,798,108 | 7/1957 | Poland | 13—31 |
| 2,836,638 | 5/1958 | Steinhoff et al. | 13—33 |

RICHARD M. WOOD, *Primary Examiner.*

V. Y. MAYEWSKY, *Assistant Examiner.*